United States Patent [19]

Ohtake

[11] Patent Number: 5,416,519
[45] Date of Patent: May 16, 1995

[54] IMAGE PICKUP APPARATUS WITH ZOOMING FUNCTION

[75] Inventor: Yoshichi Ohtake, Kamakura, Japan

[73] Assignee: Victor Company of Japan, Ltd., Yokohama, Japan

[21] Appl. No.: 106,785

[22] Filed: Aug. 16, 1993

Related U.S. Application Data

[63] Continuation of Ser. No. 731,784, Jul. 18, 1991, abandoned.

[30] Foreign Application Priority Data

Jul. 18, 1990 [JP] Japan .................. 2-190127

[51] Int. Cl.$^6$ .............................. H04N 5/232
[52] U.S. Cl. ......................... 348/351; 348/347
[58] Field of Search ............. 358/209, 227, 225;
H04N 5/232; 354/400, 402; 359/676694, 695;
348/345, 347, 348, 351, 354, 357, 335, 340

[56] References Cited

U.S. PATENT DOCUMENTS

| | | | |
|---|---|---|---|
| 4,748,509 | 5/1988 | Otake et al. | 358/227 |
| 4,924,317 | 5/1990 | Hirao et al. | 358/227 |
| 4,950,054 | 8/1990 | Wada et al. | 359/694 |
| 5,005,956 | 4/1991 | Kaneda et al. | 359/694 |
| 5,055,932 | 10/1991 | Hijikata | 358/227 |

FOREIGN PATENT DOCUMENTS 382222  8/1990 European Pat. Off. .

*Primary Examiner*—Michael T. Razavi
*Assistant Examiner*—Tuan V. Ho
*Attorney, Agent, or Firm*—Jacobson, Price, Holman & Stern

[57] ABSTRACT

There is provided an image pickup apparatus with zooming function, which is equipped with a photoelectric converter for converting an image of an object to be taken by an optical system into an electric signal. The optical system and photoelectric converter are provided as separately slidable on an optical axis. A high frequency component of the electric signal is extracted to determine if the image is in focus by means of level of the high frequency component. Responding to the result of the judgement, the optical system and photoelectric converter are respectively slid to click stop points on the optical axis where the image is in focus.

6 Claims, 4 Drawing Sheets

IMAGE PICKUP APPARATUS WITH ZOOMING FUNCTION

This is a continuation of application Ser. No. 07/731,784, filed Jul. 18, 1991, now abandoned.

BACKGROUND OF THE INVENTION

The present invention relates to an image pickup apparatus, particularly to the image pickup apparatus with zooming function.

FIG. 1 shows a known image pickup apparatus capable of autofocusing with zooming function, which has an optical system 10 provided with a front lens section 1, a zoom lens section 2 and an imaging lens section 3.

A light beam depicted by an arrow A from an object is incident, via the optical system 10, to an image pickup device (such as a charge coupled device) 4 which converts the light beam to an electric signal. The signal is then applied to a camera circuit (not shown).

The electric signal is further applied, via a gain control circuit and a band pass filter and like, to a rectifier (all of them not shown) which picks up a specific high frequency component of the signal, and outputs the rectified high frequency component as a foucsing signal. When just-focusing, the focusing signal becomes maximum. The focusing signal is applied to an autofocusing (AF) circuit 5 which drives a motor 6 to slide the imaging lens section 3 to a just-focus point on an optical axis.

If further telephotographing is required, a conversion lens 17 for telephotographing should be attached in front of the front lens section 1.

Problems with the above apparatus are that attachment of the conversion lens to the apparatus takes time and if a conversion lens provided with more than two lenses is attached, the apparatus will become bulky. Further close-photographing under the telephotographing-mode will be impossible, if the conversion lens is attached.

SUMMARY OF THE INVENTION

An object of the present invention is to provide an image pickup apparatus which is compact, capable of further telephotographing without such a conversion lens and close-photographing under the telephotographing-mode.

In carrying out the present invention in one preferred mode, there is provided an image pickup apparatus comprising an optical system, having an optical axis, for forming an image of an object to be taken by receiving light from the object, a photoelectric conversion device for converting the image into an electric signal, a judging section for extracting a high frequency component from the electric signal to determine if the image is in focus by means of level of the high frequency component and a control section responsive to a result of the judgement, for varying a distance between a part of the optical system and the photoelectric conversion device so that the image is in focus, wherein the optical system comprises a first lens section, provided as linearly slidable on the optical axis and having a plurality of click stop positions, for stepwise changing a focal length of the optical system and a second lens section, provided as slidable on the optical axis, for continuously changing the focal length of the optical system, and the control section further varies said distance between the part of the optical system and the photoelectric conversion device in response to a movement of the first lens section among the click stop positions and a slide of the second lens section so that the image is kept in focus.

Other objects and advantages of the present invention will become apparent from the detailed description to follow taken in conjunction with the appended claims.

DETAILED DESCRIPTION OF THE PREFERRED EMBODIMENTS

Figure 1:
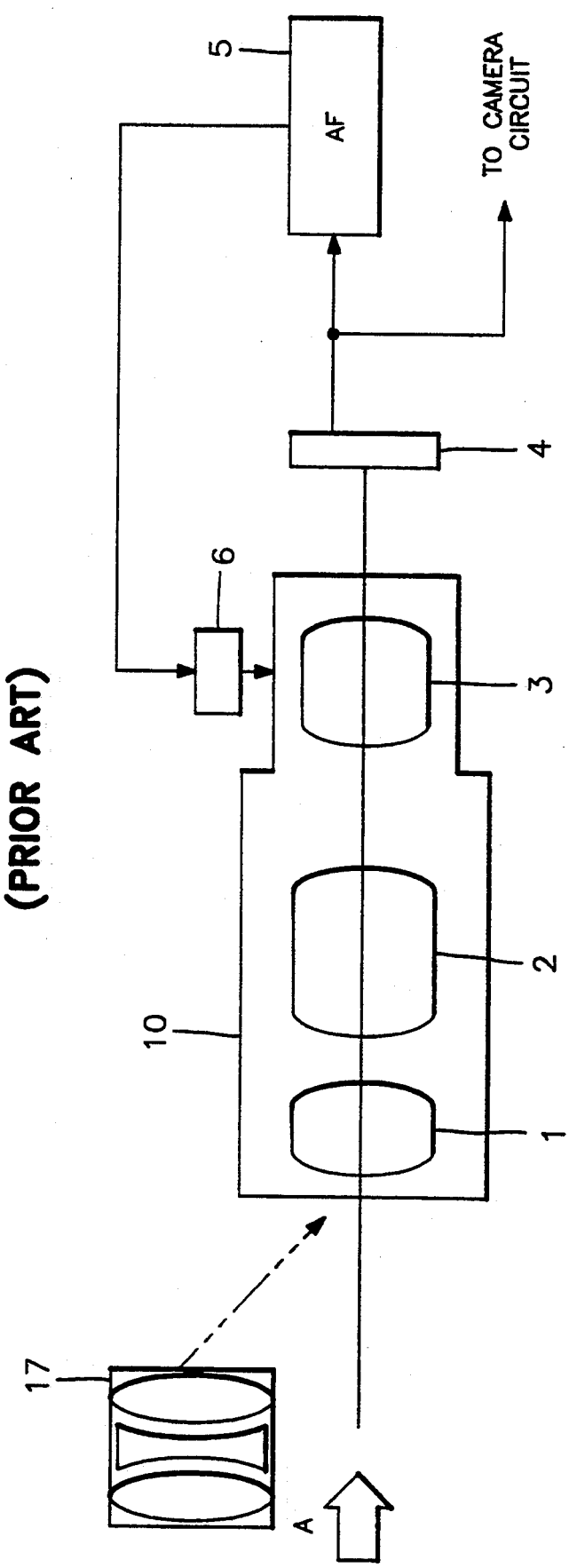
FIG. 1 shows a block diagram of a conventional image pickup apparatus.
Figure 2:
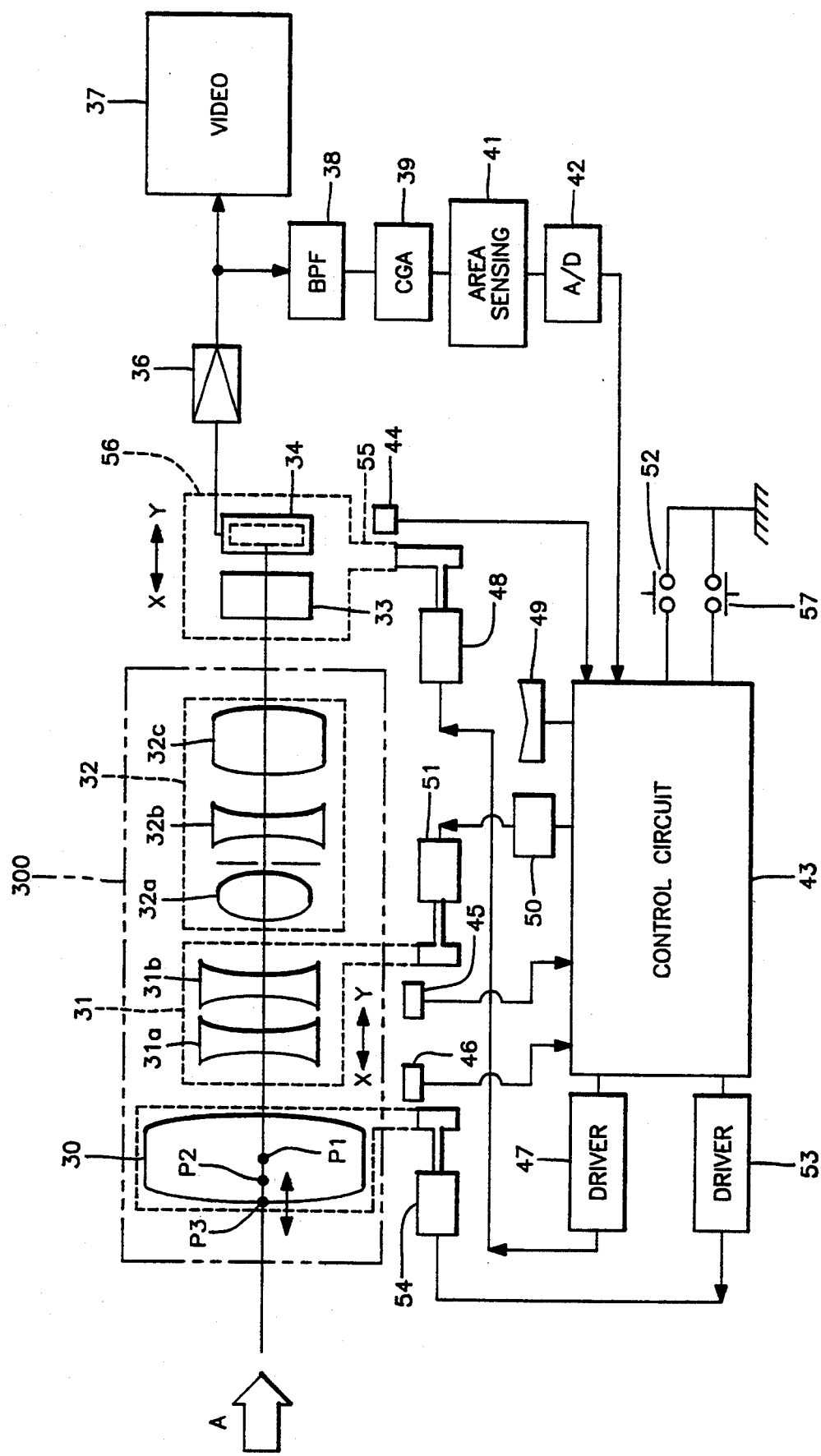
FIG. 2 is a block diagram of a preferred embodiment of an image pickup apparatus for taking photographs according to the present invention.

FIG. 2 shows a preferred embodiment of the image pickup apparatus according to the present invention. An optical system 300 shown in the figure comprises a front lens section 30 of convex lens, a zoom lens section 31 having concave lenses 31a and 31b and a fixed imaging lens section 32 having a convex lens 32a, concave lens 32b and convex lens 32c, aligned in order.

A light beam A from an object is, via the optical system 300 and a crystal lowpass filter 33, imaged on an image pickup device (a solid-state image pickup device) 34. The light beam A is converted to an electric signal in the device 34 and the electric signal is applied, via an amplifier 36, to a video circuit 37 where the electric signal is processed so as to be handled as a video signal.

The electric signal is further applied to a band pass filter (BPF) 38 where a high frequency component of the electric signal is extracted for judging if an image on the image pickup device 34 is in focus.

The high frequency component is applied to a gain control amplifier (GCA) 39 where the high frequency component is amplified if amplitude of the component is small, and is then applied to an area sensing circuit 41 where the portion, of the high frequency component, corresponding to a specific image area is extracted and rectified.

The rectified signal is applied, as a focusing signal, to an analog-to-digital converter (A/D) 42 where the focusing signal is converted into a digital focusing signal. The digital focusing signal is then applied to a control circuit 43.

To the control circuit 43, a position signal from a position sensor 44 which detects the position of the image pickup device 34 and other position signals, from position sensors 45 and 46, related to focal length of the zoom lens section 31 and front lens section 30, are also applied.

The focusing signal with respect to slide of the image pickup device 34 in a direction of the optical axis is sampled per field (image) from start of focusing and digitized by the A/D convertor 42 and applied to the control circuit 43.

In the control circuit 43, each focusing signal per field is compared with a next focusing signal in their magnitude one after another to output a differential signal.

Magnitude and polarity of the differential signal are used, with the position signals from the position sensors 44, 45 and 46 to determine the just-focusing position by a known method such as hill climbing method to output a control signal $C_1$. The signal $C_1$ is supplied to a drive circuit 47 which drives a motor 48 to slide the image pickup device 34 to the just-focusing position on the optical axis.

Figure 3:
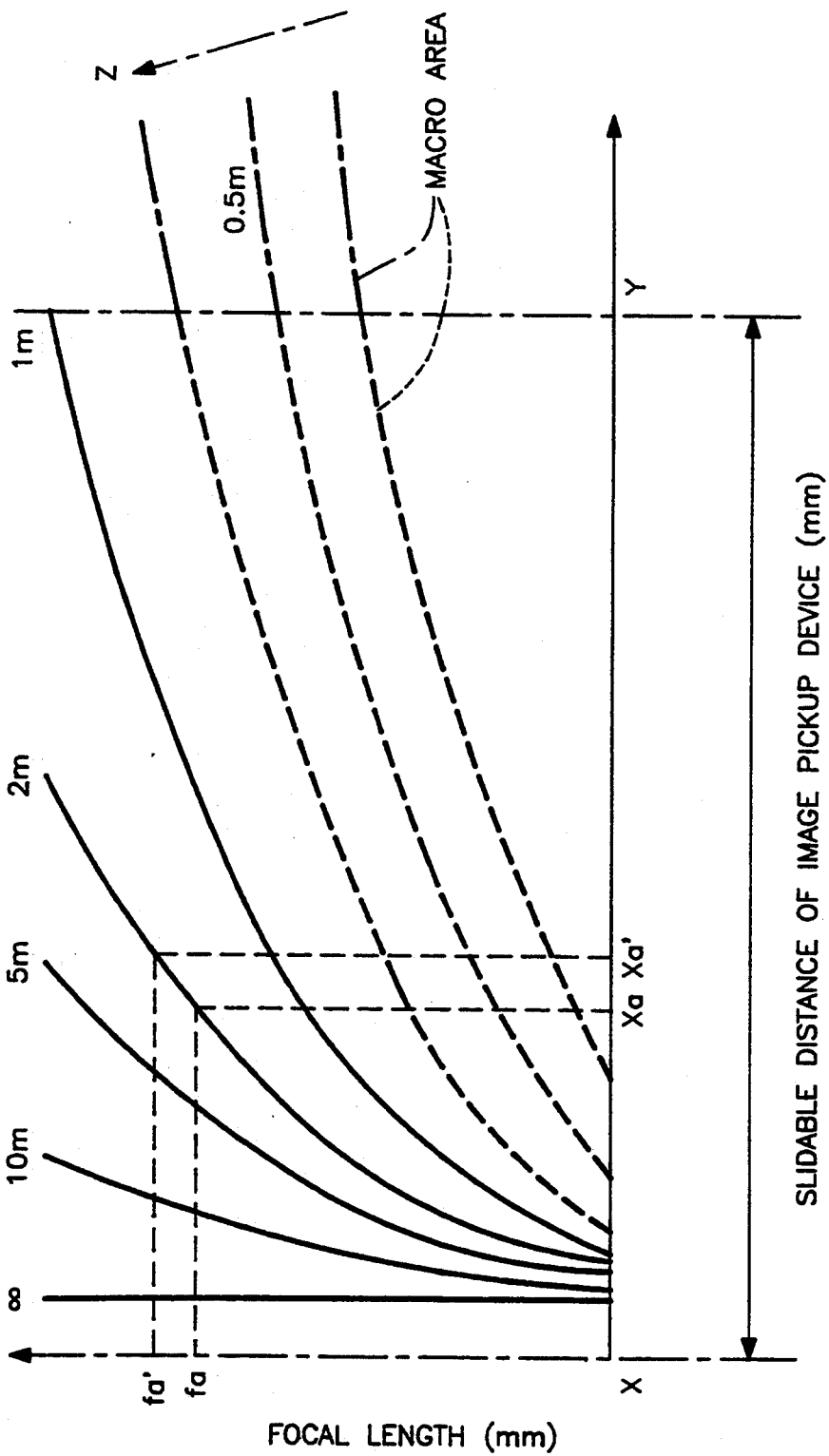
FIG. 3 is a graph showing a general relationship between focal lengths and slidable distances of an image pickup device.

FIG. 3 is a graph showing general relationships between positions of the image pickup device 34 and focal lengths of a compound lens composed of the front lens section 30, zoom lens section 31 and imaging section 32 when images of objects at respective constant distances (object distances) are in focus while the zoom lens section 31 is sliding and the front lens section 30 is on such as the point $P_1$ in FIG. 2.

The graph teaches that the just-focusing position of the image pickup device 34 varies in finite object distance. The rate of change of the just-focusing position by zooming varies in accordance with the object distance. The nearer the object, the larger the just-focusing point varies.

Therefore, it is required that a focusing point of the image pickup device 34 is corrected by sliding the device 34 in accordance with zooming.

The data-table corresponding to FIG. 3 is previously stored in the control circuit 43. How to use this data-table is explained below.

In FIG. 3, Xa is a position of the image pickup device 34 when the image of an object at a distance of two meters is in focus under a focal length fa. When a zooming switch 49 in FIG. 2 is switched to a zoom-mode for telephoto side from the above state, the control circuit 43 produces a control signal $C_2$ for sliding the concave lenses 31a and 31b, by referring to the position signal from the position sensor 45.

The concave lenses 31a and 31b are held in a lens-barrel (not shown) in a way that both lenses are relatively slid in the barrel along a cam channel curve formed therein. By detecting a rotational angle of the lens-barrel, the position signal of the concave lenses 31a and 31b are obtained.

The control circuit 43 then supplies the control signal $C_2$ to a drive circuit 50 which drives a motor 51 to slide the concave lenses 31a and 31b to the positions of a focal length fa' in FIG. 3 in the optical axis direction.

The position signals of the image pickup device 34 and front lens section 30 from the position sensors 44 and 46 are also supplied to the control circuit 43. By means of these signals, the distance of the object, when the focal length is fa and the image pickup device 34 is on the just-focusing position Xa, is determined with referring to the data-table.

Based on the determined distance, the control signal $C_1$ is supplied to the drive circuit 47 for sliding the image pickup device 34 to the just-focusing position Xa'. Another arrangement can be considered such that the concave lens 32b of the imaging lens section 32 may be slid to the just-focusing position instead of the imaging device 34.

The front lens section 30 is configured such that is is movable among three click stop positions $P_1$, $P_2$ and $P_3$ on the optical axis and usually set at the position $P_1$.

If further telephotographing is desired, a switch 52 is turned on to produce an $ON_1$ signal which is supplied to the control circuit 43. Based on the $ON_1$ signal, a drive signal is produced in the circuit 43 and is supplied to a drive circuit 53 which drives a motor 54. The motor 54 quickly and linearly slides the front lens section 30 from the position $P_1$ to the position $P_2$ on the optical axis. The front lens section 30 may be manually slid by shutting out a transfer mechanism (not shown) communicated to the motor 54 by such as a clutch mechanism.

All the curves shown in FIG. 3 are shifted to a direction Z with some deformation in accordance with the slide from $P_1$ to $P_2$ of the front lens section 30. Because, those curves are established when the front lens section 30 is on the point $P_1$ as described before.

Values corresponding to that shift and correction values modified by the shift values are previously stored in the table of the control circuit 43. The $ON_1$ signal from the switch 52 and the location of the front lens 30 which is on the point $P_2$ are detected to read out one correction value from the table. Based on the correction value, the drive circuit 47 supplies the control signal $C_1$ to the motor 48 which slides the image pickup device 34 to the just-focusing position on the optical axis.

If macro-photographing is further desired under telephotographing, the switch 52 is turned on again. This produces a second $ON_1$ signal and the control circuit 43, based on the second $ON_1$ signal, supplies the drive signal to the drive circuit 53. The drive circuit 53 drives the motor 54 which linearly slides the front lens section 30 to the position $P_3$ on the optical axis.

Accordingly, all the curves shown in FIG. 2 are further shifted to the direction Z than when the front lens section 30 is positioned on the position $P_2$. Because of this, curves (depicted by dash-dotted lines) in a macro area located outer the slidable area of the image pickup device 34, where photographing is impossible are shifted to the area where photographing is possible.

Values corresponding to the shift of the curves when the front lens section 30 is slid to the position $P_3$ and correction values modified by the shift values are also previously stored in the table in the control circuit 43. One correction value is read out from the table based on the second $ON_1$ signal from the switch 52 and a detection signal produced when the front lens section 30 on the position $P_3$. By the correction value, the image pickup device 34 is slid to the just-focusing position to enable macro-photographing.

If the front lens section 30 is desired to be returned rightward in the figure, a switch 57 is turned onto produce an $ON_2$ signal which is supplied to the control circuit 43, accordigly causing the drive motor 54 to slide the front lens section 30 from $P_3$ to $P_2$ or from $P_2$ to $P_1$. And the image pickup device 34 is slide by a correction opposite to the above cases.

According to the preferred embodiment, the front lens 30 is slid for changing the magnification of the image and the imaging lens section 32 or the image pickup device 34 is slid for just-focusing so that a conversion lens for telephotographing is eliminated and telephotographing function is improved.

Furthermore, lens-diameter of each lens section is made shorter and number of lenses is made less compared to when the conversion lens is attached.

Since, the front lens section 30 is provided as the lens for changing the magnification of the image, it is suitable for manual operation. Actually, the front lens section 30 is arranged as linearly slidable such that it quickly responds to manual operation.

Macro-photographing is made possible under telephotographing, when the front lens section 30 is slid to the position $P_3$.

When focusing is done by a motor not manual operation, the correction values corresponding to the slide of the image pickup device 34 based on the curves shown in FIG. 2 and the shift corresponding to switching among the positions $P_1$, $P_2$ and $P_3$ are stored in the table of the control circuit 43. Quick auto-focusing is thus conducted as described in the above preferred embodiment.

Arrangement of the image pickup device 34 such that it is slid for focusing instead of the optical system 300 allows space between the lenses in the system 300, to be shortened. This makes the apparatus according to the present invention be more compact than that in which an imaging lens section is slid in the case of focusing.

Figure 4:
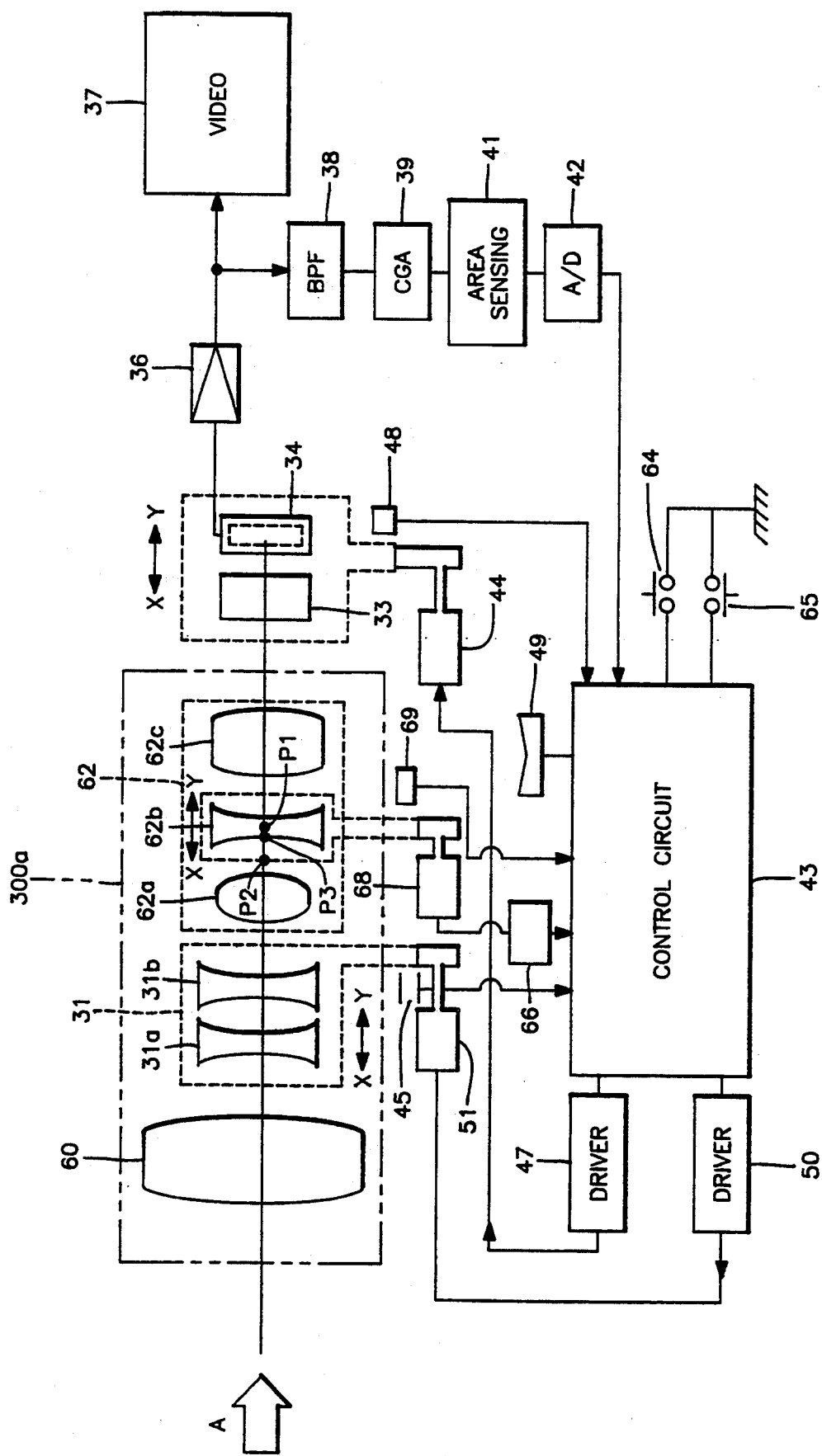
FIG. 4 is a block diagram of another preferred embodiment of the apparatus according to the present invention.

FIG. 4 shows another preferred embodiment of the apparatus according to the present invention. Reference numerals in FIG. 4 which are the same as shown in FIG. 2 designate like or equivalent elements, so that explanation of those elements is omitted.

In FIG. 4, an optical system 300a comprises a fixed front lens section 60, a zoom lens section 31 having concave lenses 31a and 31b and an imaging lens section 62 having a convex lens 62a, a concave lens 62b (combination of both lenses exhibiting the characteristics of convex lens) and a convex lens 62c.

In usual telephotographing, switching of a zoom switch 49 to a zoom-mode allows the lenses 31a and 31b of the zoom lens section 31 to be slid in a specific direction to obtain a closed-up image.

The concave lens 62b of the imaging lens section 62 is configured such that it slides to three click stop positions $P_1$, $P_2$ and $P_3$ for changing the magnification of the image. The position $P_1$ is for normal telephotographing.

If further telephotographing is desired, a switch 64 is turned on. This produces an $ON_3$ signal which is supplied to a drive circuit 66 to drive a motor 68. The lens 62b is slid to the position $P_2$ on the optical axis.

This slide to the position $P_2$ is detected by a position sensor 69 which produces a position signal. This position signal is supplied to a control circuit 43.

By means of the position and $ON_3$ signals, a correction value which is prestored in a data-table of the control circuit 43 and modified by the shift of the lens 62b is read out from the table.

The image pickup device 34 is slid to a just-focusing position, based on the correction value, to obtain a closed-up image which is bigger than one under the normal telephotographing.

Next, when the switch 64 is turned on again, the concave lens 62b is slid to the position $P_3$. Like the former embodiment, the curves (depicted by dash-dotted lines) in macro area located outside of the slidable area of the image pickup device 34 are shifted in the direction Z in FIG. 3 to enable macro photographing under the telephotographing mode.

When the concave lens 62b is desired to be returned from $P_3$ to $P_2$ or from $P_2$ to $P_1$, a switch 65 is turned on.

The operation of the control circuit 43 and use of the data-table provided therein are the same as explained in the former embodiment. Difference between the former and later embodiments is that the front lens section 30 in the former is to be slid among the three click stop points $P_1$, $P_2$, and $P_3$ while the imaging lens section 62 is in the latter.

The concave lens 62b of the imaging lens section 62 is arranged as the lens for changing the magnification of the image in the latter embodiment. Compared to the former case in which the front lens section is used for changing the magnification of the image, configuration of the lens section 62 is made compact so that a small power motor is available and also power consumption is made less if the apparatus of the present invention is battery-powered.

The above two embodiments are for telephotographing. Not only that, the present invention can be applied to wide-range photographing in which a multi-mode lens section is slid in a reverse direction to the case of telephotographing.

Furthermore, the control circuit 43 is provided for auto-focusing in the above two embodiments, manual focusing is available by a known mechanism.

While the presently preferred embodiments of the present invention have been shown and described, it is to be understood these disclosures are for the purpose of illustration and that various changes and modifications may be made without departing from the scope of the invention as set forth in the appended claims.

What is claimed is:

1. An image pickup apparatus comprising:
   an optical system having an optical axis and an adjustable focal length for forming an image of an object to be taken by receiving light reflected by the object, the optical system comprising:
   a first lens section for telephotographing and/or macro-photographing, the first lens section being arranged so as to permit linear transferring of said first lens section between a plurality of discrete positions along the optical axis;
   a second lens section for zooming, the second lens section being arranged so as to permit continuous sliding of said second lens section on the optical axis for continuously changing the focal length of the optical system;
   a third lens section provided on the optical axis for forming the image by receiving light reflected by the object, the third lens section being arranged so as to permit continuous sliding of said third lens section on the optical axis;
   a photoelectric conversion device provided on an extended line of the optical axis for converting the image into an electric signal containing high and low frequency components of the image;
   judging means for extracting the high frequency component from the electric signal and detecting a level of the high frequency component to determine a focus condition of the image according to the level of the high frequency component and to generate a focusing signal;
   detection means for detecting positions of the first and the second lens sections on the optical axis and a position of the third lens section on the optical axis to generate first, second and third lens position signals, respectively;
   distance varying means for varying a relative distance between the third lens section and the photoelectric conversion device to vary the level of high frequency component in the electric signal; and
   control means for controlling the distance varying means to vary the position of the third lens section to maintain the image in focus in response to the focusing signal, the first, second and third lens position signals.

2. An apparatus according to claim 1, wherein the control means comprises:
   means for telephotographing in response to the first lens position signal corresponding to one of the discrete positions, and for macro-photographing in response to the first lens position signal corresponding to another of the discrete positions, and for zooming in response to the second lens position signal.

3. An apparatus according to claim 1, wherein the optical system further comprises a multi-mode lens section for wide-range photographing, the multi-mode lens section being slidable on the optical axis.

4. An apparatus according to claim 1, wherein the optical system further comprises a multi-mode lens section for wide-range photographing, the multi-mode lens section being slidable on the optical axis.

5. An image pickup apparatus comprising:
an optical system having an optical axis and an adjustable focal length for forming an image of an object to be taken by receiving light reflected by the object, the optical system comprising:
a first lens section for telephotographing and/or macro-photographing, the first lens section being arranged so as to permit linear transferring of said first lens section between a plurality of discrete positions along the optical axis;
a second lens section for zooming, the second lens section being arranged so as to permit continuous sliding of said second lens section on the optical axis for continuously changing the focal length of the optical system;
a third lens section provided on the optical axis for forming the image by receiving light reflected by the object;
a photoelectric conversion device provided on an extended line of the optical axis for converting the image into an electric signal containing high and low frequency components of the image, the photoelectric conversion device being arranged so as to permit continuous sliding of said photoelectric conversion device on an extended line of the optical axis;
judging means for extracting the high frequency component from the electric signal and detecting a level of the high frequency component to determine a focus condition of the image according to the level of the high frequency component and to generate a focusing signal;
detection means for detecting positions of the first and the second lens sections on the optical axis and a position of the photoelectric conversion device on the extended line of the optical axis to generate first and second lens position signals and a conversion device position signal, respectively;
distance varying means for varying a relative distance between the third lens section and the photoelectric conversion device to vary the level of high frequency component in the electric signal; and
control means for controlling the distance varying means to vary the position of the photoelectric conversion device to maintain the image in focus in response to the focusing signal, the first and second lens position signals and the conversion device position signal.

6. An apparatus according to claim 5, wherein the control means comprises:
means for telephotographing in response to the first lens position signal corresponding to one of the discrete positions, and for macro-photographing in response to the first lens position signal corresponding to another of the discrete positions, and for zooming in response to the second lens position signal.

* * * * *